(12) United States Patent
Montague

(10) Patent No.: US 7,626,495 B2
(45) Date of Patent: Dec. 1, 2009

(54) SEATBELT USAGE INDICATOR SYSTEM

(76) Inventor: Dwayne A. Montague, 1666 McBrady Crescent, Pickering (CA) L1X 2A6

( * ) Notice: Subject to any disclaimer, the term of this patent is extended or adjusted under 35 U.S.C. 154(b) by 281 days.

(21) Appl. No.: 11/625,713

(22) Filed: Jan. 22, 2007

(65) Prior Publication Data

US 2008/0177446 A1    Jul. 24, 2008

(51) Int. Cl.
*B60Q 1/00* (2006.01)
*G06F 7/00* (2006.01)
(52) U.S. Cl. .................... 340/457.1; 700/215
(58) Field of Classification Search .......... 340/457.1, 340/522; 235/96, 97; 700/214, 215
See application file for complete search history.

(56) References Cited

U.S. PATENT DOCUMENTS

| | | | |
|---|---|---|---|
| 3,074,055 A * | 1/1963 | Rudolph et al. | 180/268 |
| D269,165 S | 5/1983 | Driscoll | |
| 4,667,336 A * | 5/1987 | Best | 377/15 |
| 4,849,733 A * | 7/1989 | Conigliaro et al. | 340/457.1 |
| 5,119,407 A * | 6/1992 | Ozmeral | 377/15 |
| 5,877,707 A | 3/1999 | Kowalick | |
| 6,059,066 A | 5/2000 | Lary | |
| 6,204,757 B1 | 3/2001 | Evans et al. | |
| 2004/0051293 A1* | 3/2004 | Go | 280/801.1 |

* cited by examiner

*Primary Examiner*—Benjamin C Lee
*Assistant Examiner*—Sigmund Tang

(57) ABSTRACT

A seatbelt usage indicator system for indicating the frequency of usage of a seatbelt of a vehicle includes a plurality of buckles being secured to a vehicle. A latch plate of each of a plurality of seatbelts is inserted into one of the buckles to secure each of the seatbelts to one of the buckles. Each of the buckles has one of a plurality of counter assemblies coupled thereto. Each of the counter assemblies is actuated when the latch plate is inserted into the associated one of the buckles to count the number of times the latch plate has been inserted. Each of the counter assemblies displays the number of times the latch plate has been inserted into the associated one of the buckles.

10 Claims, 4 Drawing Sheets

SEATBELT USAGE INDICATOR SYSTEM

BACKGROUND OF THE INVENTION

1. Field of the Invention

The present invention relates to seatbelt usage odometers and more particularly pertains to a new seatbelt usage odometer for indicating the frequency of usage of a seatbelt of a vehicle.

2. Description of the Prior Art

The use of seatbelt usage odometers is known in the prior art. While these devices fulfill their respective, particular objectives and requirements, the need remains for a system that has certain improved features that sense the insertion of a latch plate of a seatbelt into the system to increment the system and displays the number of time the system had received the latch plate. Additionally, the system should an indicator mounted to a dashboard of the vehicle to remind occupants to wear their seatbelt.

SUMMARY OF THE INVENTION

The present invention meets the needs presented above by generally comprising a plurality of buckles being secured to a vehicle. A latch plate of each of a plurality of seatbelts is inserted into one of the buckles to secure each of the seatbelts to one of the buckles. Each of the buckles has one of a plurality of counter assemblies coupled thereto. Each of the counter assemblies is actuated when the latch plate is inserted into the associated one of the buckles to count the number of times the latch plate has been inserted. Each of the counter assemblies displays the number of times the latch plate has been inserted into the associated one of the buckles.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
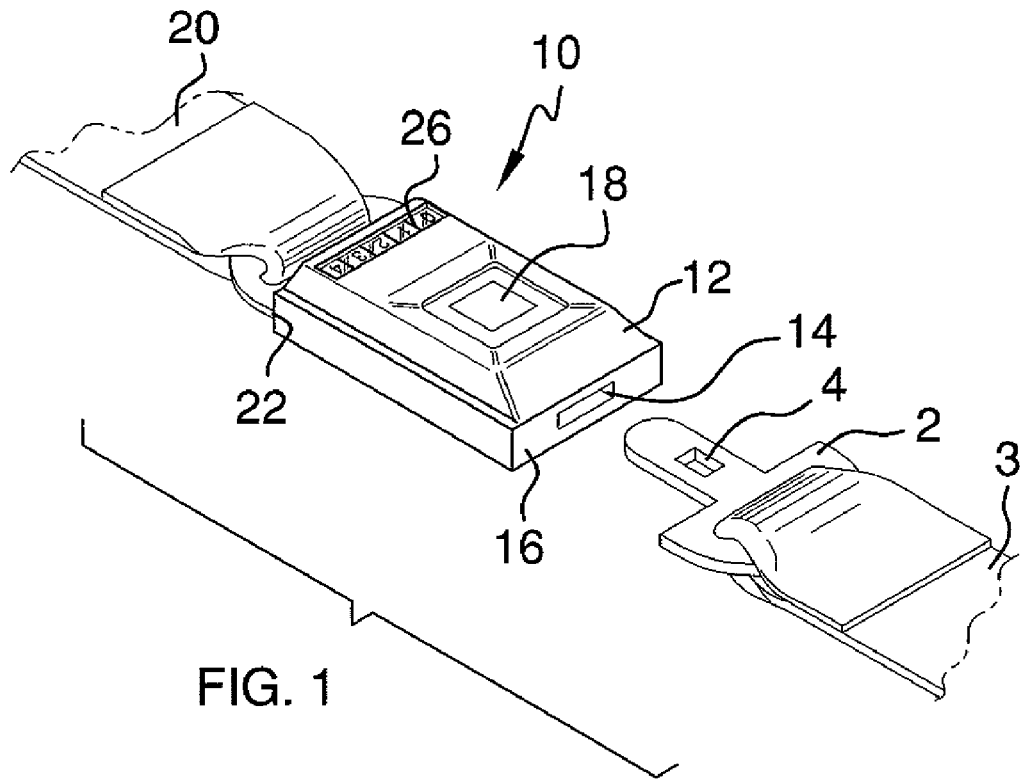
FIG. 1 is a perspective view of a seatbelt usage indicator system according to the present invention with the latch plate removed.
Figure 2:
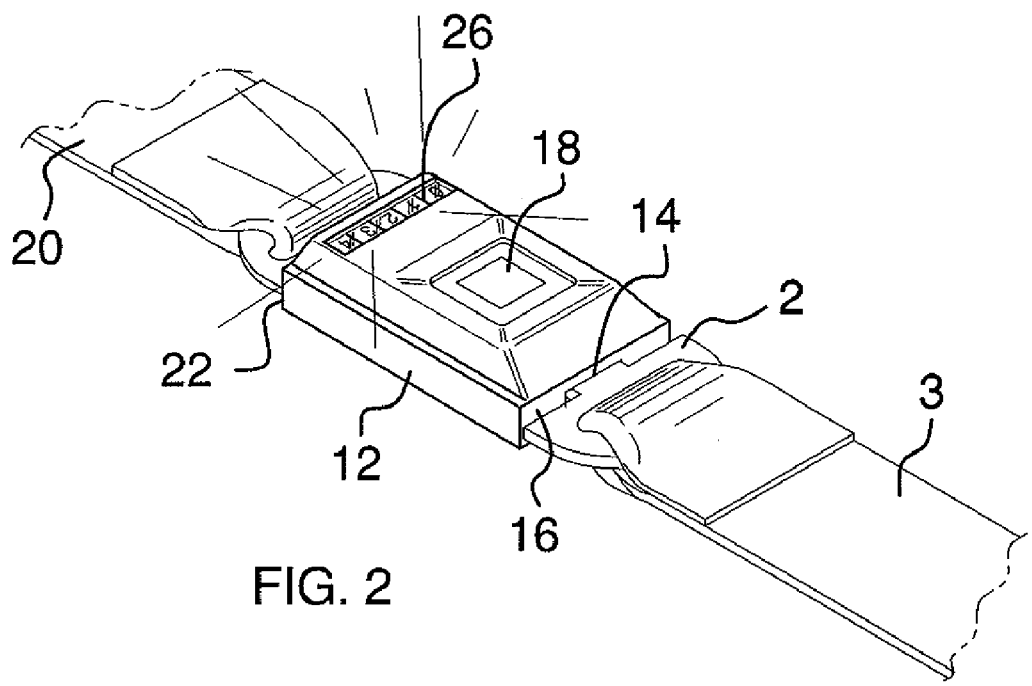
FIG. 2 is a perspective view of the present invention with the latch plate inserted.
Figure 3:
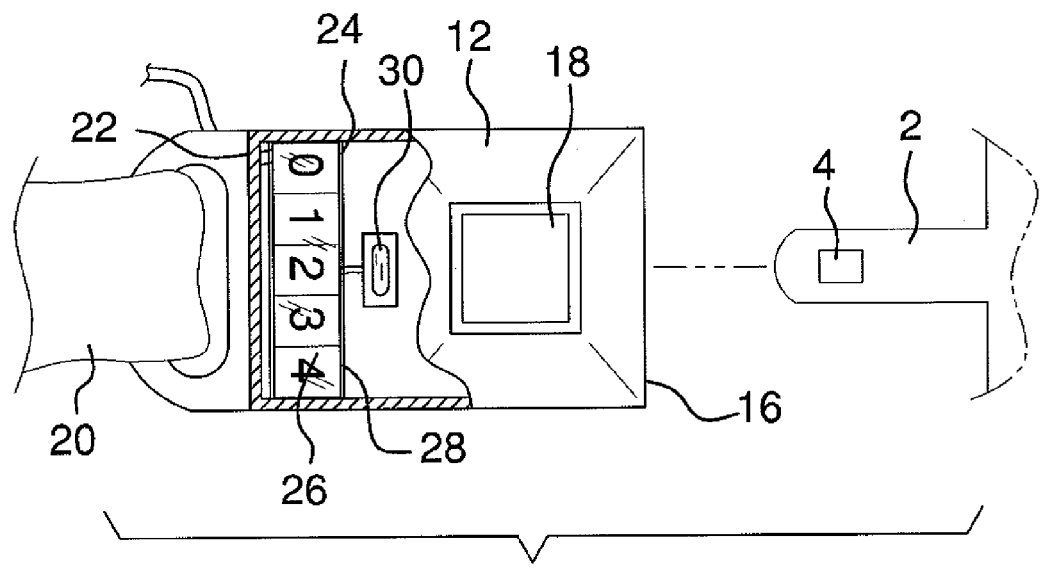
FIG. 3 is a top view of the present invention with portion of the buckle removed to expose the counter assembly
Figure 4:
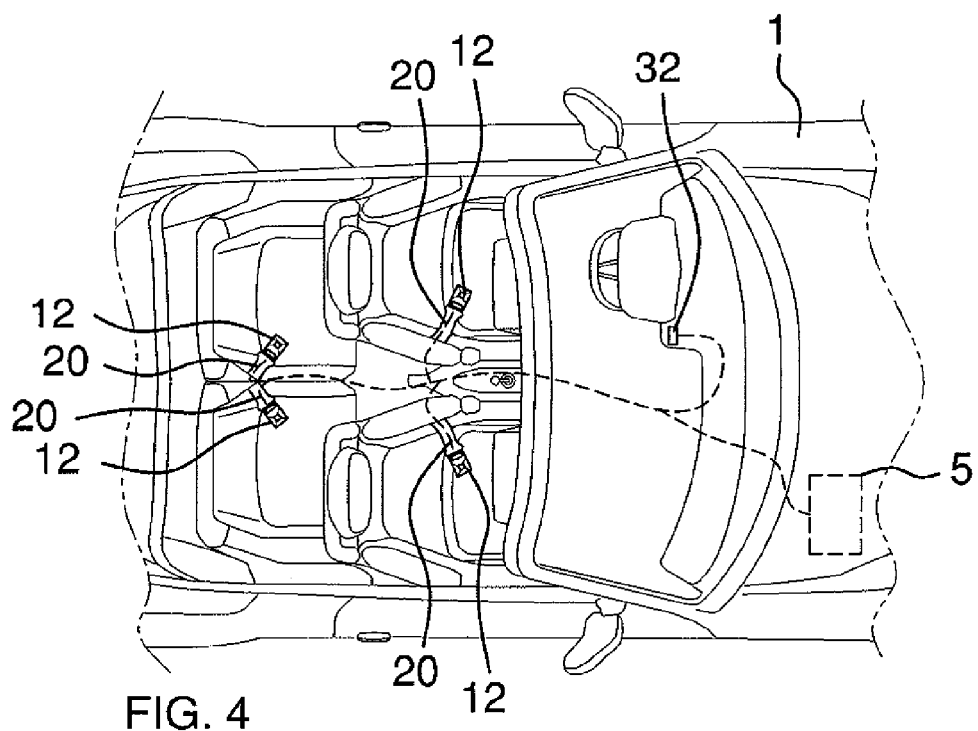
FIG. 4 is a top view of the present invention positioned in a vehicle.

With reference now to the drawings, and in particular to FIGS. 1 through 6 thereof, a new seatbelt usage odometer embodying the principles and concepts of the present invention and generally designated by the reference numeral 10 will be described.

As best illustrated in FIGS. 1 through 6, the seatbelt usage indicator system 10 generally comprises a plurality of buckles 12 being secured to a vehicle 1. A latch plate 2 of each of a plurality of seatbelts 3 is inserted into one of the buckles 12 to secure each of the seatbelts 3 to one of the buckles 12. Each of the buckles 12 has a slot 14 extending into a first end 16 of the associated one of the buckles 12 to receive the latch plate 2. Each of the buckles 12 includes a button mechanism 18 extending through an aperture 4 in the latch plate 2 to secure the latch plate 2 to the associated one of the buckles 12. The button mechanism 18 is actuated to release the latch plate 2 and permit the latch plate 2 to be removed from the associated one of the buckles 12. Each of the buckles 12 has one of a plurality of anchoring straps 20 coupled to a second end 22 thereof. Each of the anchoring straps 20 is coupled to the vehicle 1 to secure the associated one of the buckles 12 to the vehicle 1.

Each of the buckles 12 has one of a plurality of counter assemblies 24 coupled thereto. Each of the counter assemblies 24 is actuated when the latch plate 2 is inserted into the associated one of the buckles 12 to count the number of times the latch plate 2 has been inserted. Each of the counter assemblies 24 displays the number of times the latch plate 2 has been inserted into the associated one of the buckles 12. Each of the counter assemblies 24 includes a display 26 coupled to the associated one of the buckles 12 to be viewed. The display 26 is positioned adjacent the second end 22 of the associated one of the buckles 12.

Each of the counter assemblies 24 also includes a processing unit 28 positioned in the associated one of the buckles 12 and electrically coupled to the display 26. The processing unit 28 is electrically coupled to an electrical system 5 of the vehicle 1. The processing unit 28 actuates the display 26 to display the number of times the latch plate 2 has been inserted into the associated one to the buckles 12.

Additionally, each of the counter assemblies 24 includes a sensor 30 positioned in the associated one of the buckles 12 and electrically coupled to the processing unit 28. The sensor 30 senses insertion of the latch plate 2 into the associated one of the buckles 12 and actuates the processing unit 28 to increment the number displayed on the display 26. An indicator 32 is mounted to a dashboard of the vehicle 1 to be viewed by a driver of the vehicle 1. The indicator 32 is electrically coupled to the processing unit 28 of each of the counter assemblies 24 and is illuminated to remind passengers of the vehicle 1 to fasten the seatbelts 3.

Figure 5:
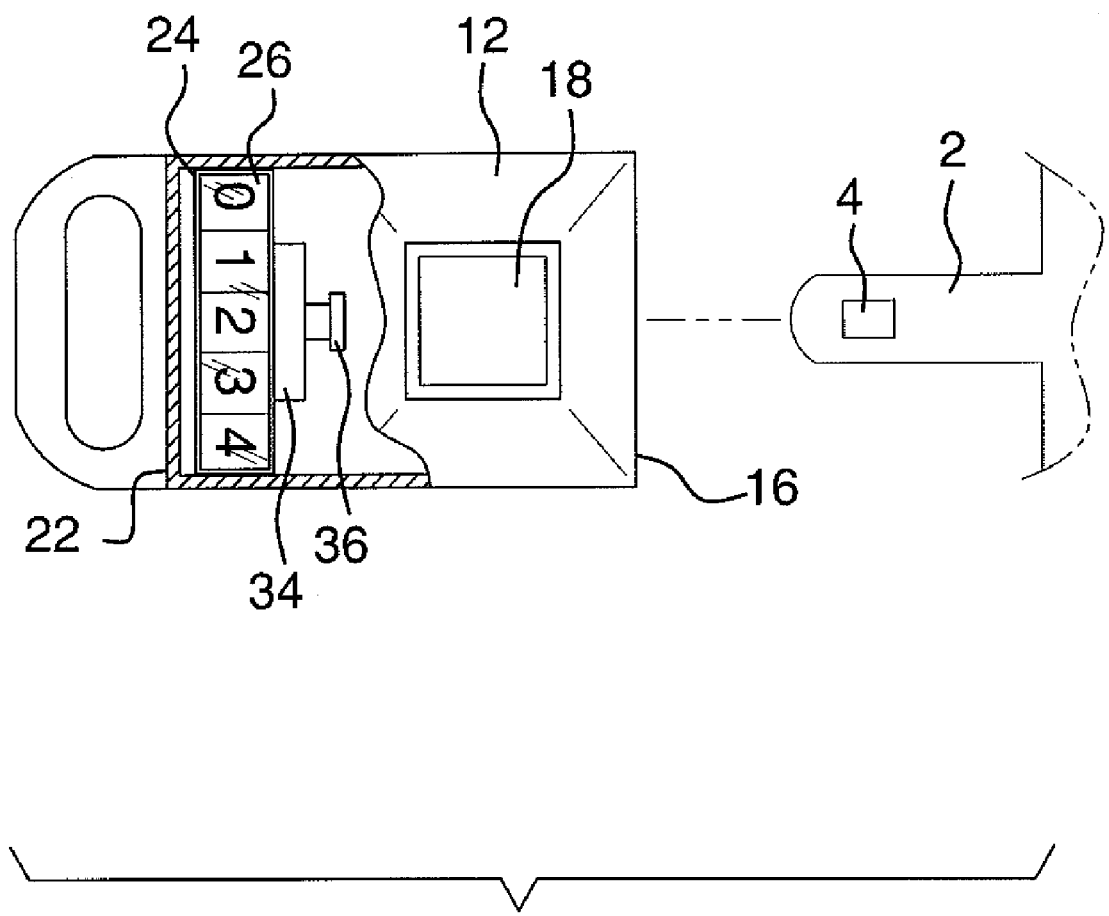
FIG. 5 is a top view of an embodiment of the present invention with a portion of the buckle removed to expose the counter assembly.
Figure 6:
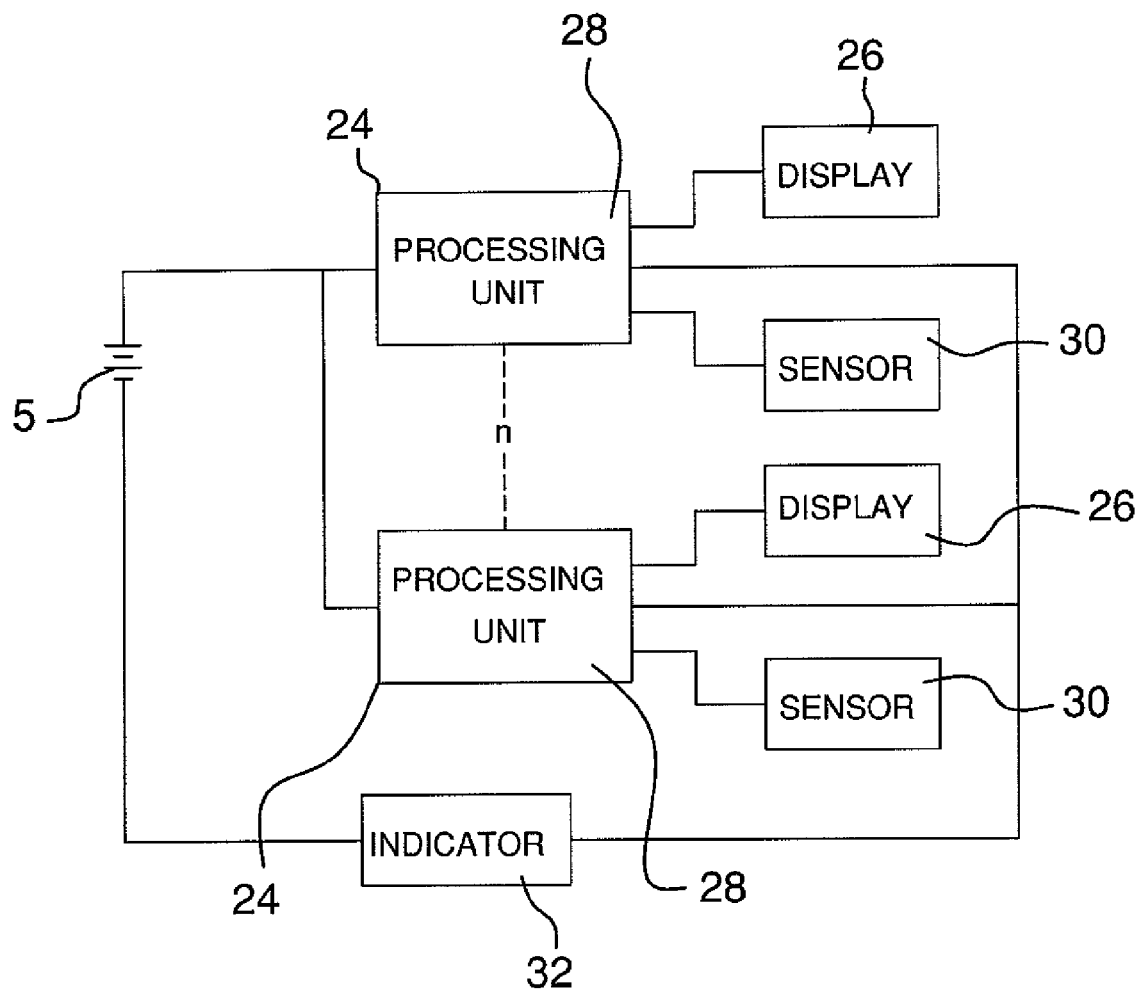
FIG. 6 is a chematic view of the counter assembly of the present invention.

In an embodiment, as shown in FIG. 5, each of the counter assemblies 24 includes a gear box 34 positioned in the associated one of the buckles 12 and operationally coupled to the display 26. The gear box 34 increments a number displayed on the display 26 when the gear box 34 is actuated. A push button 36 is operationally coupled to the gear box 34 and positioned in the associated one of the buckles 12. The push button 36 is depressed by the latch plate 2 to actuate the gear box 34 when the latch plate 2 is inserted into the associated one of the buckles 12.

In use, the latch plate 2 of the seatbelts 3 is placed into the slot 14 of one of the buckles 12 to secure the seatbelt 3 to the vehicle 1. As the latch plate 2 is inserted, the sensor 30 detects the presence of the latch plate 2 and actuates the processing unit 28 to increment the number shown on the display 26. The number on the display 26 would indicate the amount of usage of the seatbelt 3 in the vehicle 1. In a car it would indicate the frequency of which the seatbelt 3 was used by the driver to help determine usage of the seatbelt 3 during an accident investigation. In an airplane the display 26 would help determine when it is necessary to replace the seatbelt 3. Additionally, the processing unit 28 could be programmed to reset the display 26 when the vehicle 1 is started and increment the number on the display 26 when the latch plate 2 is inserted to provide positive proof the occupants of vehicle 1 were using the seatbelts 3 during an accident.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seatbelt usage indicator system for indicating the use of seatbelts of a vehicle, said system comprising:
   a plurality of buckles being secured to the vehicle, a latch plate of each of the seatbelts being inserted into one of said buckles to secure each of the seatbelts to one of said buckles; and
   a plurality of counter assemblies, each of said buckles having one of said counter assemblies coupled thereto, each of said counter assemblies being actuated when the latch plate is inserted into the associated one of said buckles to count the number of times the latch plate has been inserted, each of said counter assemblies displaying the number of times the latch plate has been inserted into the associated one of said buckles, each of said counter assemblies including:
      a display being coupled to the associated one of said buckles to be viewed;
      a processing unit being positioned in the associated one of said buckles and electrically coupled to said display, said processing unit being electrically coupled to an electrical system of the vehicle, said processing unit actuating said display to display the number of times the latch plate has been inserted into the associated one to said buckles, said processing unit being programmable to reset said display when the vehicle is started and increment the number on said display when said latch plate is inserted into the associated one of said buckles.

2. The system according to claim 1, wherein each of said buckles has a slot extending into a first end of the associated one of said buckles to receive the latch plate.

3. The system according to claim 1, wherein each of said buckles includes a button mechanism extending through an aperture in the latch plate to secure the latch plate to the associated one of said buckles, said button mechanism being actuated to release the latch plate and permit the latch plate to be removed from the associated one of said buckles.

4. The system according to claim 1, wherein said display is positioned adjacent a second end of the associated one of said buckles.

5. The system according to claim 1, wherein each of said counter assemblies includes a sensor being positioned in the associated one of said buckles and being electrically coupled to said processing unit, said sensor sensing insertion of the latch plate into the associated one of said buckles and actuating said processing unit to increment the number displayed on said display.

6. The system according to claim 1, further comprises an indicator being mounted to a dashboard of the vehicle to be viewed by a driver of the vehicle, said indicator being electrically coupled to said processing unit of each of said counter assemblies and being illuminated to remind passengers of the vehicle to fasten the seatbelts.

7. The system according to claim 4, wherein each of said counter assemblies includes a gear box being positioned in the associated one of said buckles and being operationally coupled to said display, said gear box incrementing a number displayed on said display when said gear box is actuated.

8. The system according to claim 7, wherein each of said counter assemblies includes a push button being operationally coupled to said gear box and positioned in the associated one of said buckles, said push button being depressed by the latch plate to actuate said gear box when the latch plate is inserted into the associated one of said buckles.

9. The system according to claim 1, further comprising a plurality of anchoring straps, each of said buckles having one of said anchoring straps being coupled to a second end thereof, each of said anchoring straps being coupled to the vehicle to secure the associated one of said buckles to the vehicle.

10. A seatbelt usage indicator system for indicating the use of seatbelts of a vehicle, said system comprising:
   a plurality of buckles being secured to the vehicle, a latch plate of each of the seatbelts being inserted into one of said buckles to secure each of the seatbelts to one of said buckles, each of said buckles having a slot extending into a first end of the associated one of said buckles to receive the latch plate, each of said buckles including a button mechanism extending through an aperture in the latch plate to secure the latch plate to the associated one of said buckles, said button mechanism being actuated to release the latch plate and permit the latch plate to be removed from the associated one of said buckles;
   a plurality of counter assemblies, each of said buckles having one of said counter assemblies coupled thereto, each of said counter assemblies being actuated when the latch plate is inserted into the associated one of said buckles to count the number of times the latch plate has been inserted, each of said counter assemblies displaying the number of times the latch plate has been inserted into the associated one of said buckles, each of said counter assemblies comprising;
      a display being coupled to the associated one of said buckles to be viewed, said display being positioned adjacent a second end of the associated one of said buckles;
      a processing unit being positioned in the associated one of said buckles and electrically coupled to said display, said processing unit being electrically coupled to an electrical system of the vehicle, said processing unit actuating said display to display the number of times the latch plate has been inserted into the associated one to said buckles;

a sensor being positioned in the associated one of said buckles and being electrically coupled to said processing unit, said sensor sensing insertion of the latch plate into the associated one of said buckles and actuating said processing unit to increment the number displayed on said display;

said processing unit being programmable to reset said display when the vehicle is started and increment the number on said display when said latch plate is inserted into the associated one of said buckles;

an indicator being mounted to a dashboard of the vehicle to be viewed by a driver of the vehicle, said indicator being electrically coupled to said processing unit of each of said counter assemblies and being illuminated to remind passengers of the vehicle to fasten the seatbelts; and a plurality of anchoring straps, each of said buckles having one of said anchoring straps being coupled to said second end thereof, each of said anchoring straps being coupled to the vehicle to secure the associated one of said buckles to the vehicle.

* * * * *